(12) United States Patent
Shinoda et al.

(10) Patent No.: US 7,399,178 B2
(45) Date of Patent: Jul. 15, 2008

(54) INJECTION DEVICE HAVING A RECIPROCAL PLUNGER

(75) Inventors: Takashi Shinoda, Ohbu (JP); Yoshimasa Makino, Ohbu (JP)

(73) Assignee: Kabushiki Kaisha Meiki Seisakusho, Ohbu-shi (JP)

( * ) Notice: Subject to any disclaimer, the term of this patent is extended or adjusted under 35 U.S.C. 154(b) by 252 days.

(21) Appl. No.: 11/280,253

(22) Filed: Nov. 17, 2005

(65) Prior Publication Data

US 2006/0134263 A1    Jun. 22, 2006

(30) Foreign Application Priority Data

Dec. 16, 2004    (JP) .............................. 2004-364330

(51) Int. Cl.
*B29C 45/48* (2006.01)
(52) U.S. Cl. ........................ 425/557; 425/559; 425/560; 425/561
(58) Field of Classification Search .................. 425/563, 425/557, 559, 560, 561
See application file for complete search history.

(56) References Cited

U.S. PATENT DOCUMENTS 6,554,603 B1 *   4/2003   Schreiner et al. ............ 425/559

FOREIGN PATENT DOCUMENTS

JP    61-106220    5/1986

\* cited by examiner

*Primary Examiner*—Tim Heitbrink
(74) *Attorney, Agent, or Firm*—Browdy and Neimark

(57) ABSTRACT

In an injection device 10 having a plunger 11 reciprocably inserted into a heating cylinder 16, in which a molten material M is injected by the plunger 11 via a nozzle 21, a sealing portion 13 set so that the molten material M is prevented from easily entering a gap A between the plunger 11 and an inner wall 32 of the heating cylinder 16 is provided on the portion of the plunger 11, on the side of the nozzle 21, and the portion of the sealing portion 13, on the side of the nozzle 21 is a core keeping portion 14 provided so that an annular portion 20 which is formed on a front portion of the plunger 11 and is connected to a storage portion 19 of the molten material M is formed between the core keeping portion 14 and the inner wall 32 of the heating cylinder 16.

7 Claims, 4 Drawing Sheets

INJECTION DEVICE HAVING A RECIPROCAL PLUNGER

BACKGROUND OF THE INVENTION

1. Field of the Invention

The present invention relates to a technology, in an injection device using a plunger, to prevent the plunger from being damaged and prevent a molten material from leaking.

2. Background Art

As shown in FIG. 4, a conventional injection device 29 has a plunger 30 reciprocably inserted into a heating cylinder 16. The injection device 29 injects a molten material M supplied from a supply passage 17 provided in front of the plunger 30, using the plunger 30, to charge the same into a die (not shown) via a nozzle 21. The plunger 30 is comprised of a base 12 connected to a reciprocating drive unit (not shown); a sealing portion 24 secured to the end portion of the base 12, on the side of the nozzle 21; a conical tip 25 formed on the end face of the sealing portion 24, on the side of the nozzle 21. The sealing portion 24 is provided so that a gap A is formed between the sealing portion 24 and an inner wall 32 of the heating cylinder 16. The diameter of the base 12 is smaller than that of the sealing portion 24. Therefore, the gap A is formed so that the plunger 30 can easily slide and reciprocate on the inner wall 32 of the heating cylinder 16, and the molten material M cannot easily enter and leak therethrough toward the base 12. For example, if the plunger 30 has the sealing portion 24 having a diameter of 60 mm, the gap A is 70 μm. Numeral 18 designates a branching passage.

When an injection molding is carried out in the above injection device 29, the molten material M is transferred from a plasticizing device (not shown) connected to the supply passage 17, to backwardly move a predetermined distance a plunger 11 in accordance with the volume of a product to be molded in a die. As a result, a predetermined amount of molten material M is stored in the storage portion 31 formed in front of the plunger 30 in the inner hole of the heating cylinder 16. After the supply passage 17 is closed by a valve (not shown), the reciprocating drive unit forwardly moves the plunger 30. The forwardly moved plunger 30 injects the molten material M through the nozzle 21 to charge the molten material M into a cavity of a die, against which the tip of the nozzle 21 is abutted. In this respect, in the molten material M, an injection pressure associated with a fluid resistance occurred when the molten material M is charged into the cavity of the die, occurs. In general, the injection pressure increases as the plunger 11 moves forwardly, and reaches a maximum value when the cavity of the die is substantially filled with the molten material M. Due to the injection pressure, the molten material M enters the gap A.

However, the gap A is not uniformly formed on the entire circumference of the sealing portion 24 because the core of the sealing portion 24 is not kept at the center of the cylinder. Accordingly, if the sealing portion 24 is not coaxial with the inner hole of the heating cylinder 16, and partially has, on its surface, a recessed portion, the molten material M first enters a widened portion of the gap A. As a result, the portion of the gap A, diametrically opposed to the portion of the gap A, which the molten material M first enters, is so narrow that the molten material M can hardly enter. Accordingly, more molten material M enters the widened portion of the gap A, and the sealing portion 24 slides while being strongly pressed by the inner wall 32 of heating cylinder 16 in the narrow portion of the gap A. In order to sufficiently prevent the molten material M from leaking through the sealing portion 24 and, especially, to use a molten material M having a low viscosity, the gap A may be relatively narrowed. In such a case, in the vicinity of the forwardmost position of the plunger 30, the plunger 30 and the inner wall 32 of the heating cylinder 16 are in contact with each other and, accordingly, a scoring occurs on the plunger 30 or the inner wall 32 of the heating cylinder 16.

In order to solve the problems, as described in Japanese Unexamined Patent Publication (Kokai) No. 61-106220, there is provided a sealing portion provided with a labyrinth groove. The labyrinth groove is obtained by forming a plurality of annular grooves in the outer peripheral surface of the sealing portion of the plunger, and functions as an excellent seal using a curved clearance having continuous wide and narrow portions. The inventors of this application experimentally produced and examined a sealing portion having, in its peripheral surface, a longitudinal groove along a moving direction of the plunger or a longitudinal groove connected to the labyrinth groove. However, the molten material M cannot be prevented from leaking through the sealing portion, and a scoring cannot be prevented from occurring on the sealing portion by either of the above methods.

BRIEF SUMMARY OF INVENTION

The present invention is provided to solve the above problems, and the object of the present invention is to provide an injection device in which a molten material is prevented from leaking through a plunger and a scoring is prevented from being generated by the plunger. According to the present invention, there is provided an injection device having a plunger reciprocably inserted into a heating cylinder, in which a molten material supplied to the front of the plunger is injected by the plunger via a nozzle and is charged into a die, wherein a sealing portion set so that the molten material is prevented from easily entering a gap between the plunger and an inner wall of a heating cylinder, is provided on the portion of the plunger, on the side of the nozzle; and the portion of the sealing portion, on the side of the nozzle is a core keeping portion provided so that an annular portion which is formed on a front portion of the plunger and is connected to the storage portion of the molten material is formed between the core keeping portion and the inner wall of the heating cylinder.

DETAILED DESCRIPTION OF THE INVENTION

Figure 1:
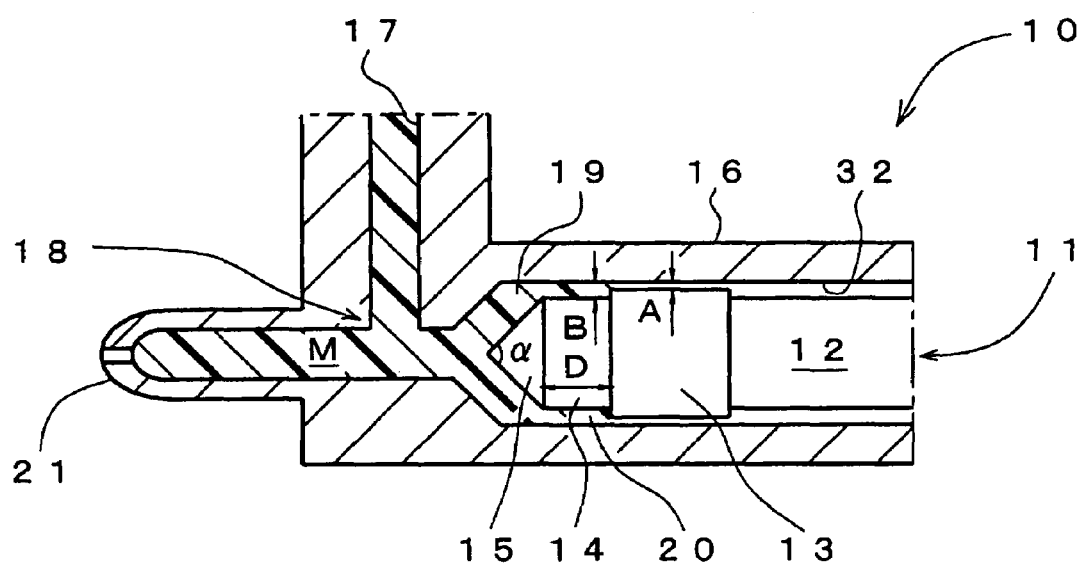
FIG. 1 is a sectional view of an embodiment of a main portion of an injection device according to the present invention.

As shown in FIG. 1, an injection device 10 injects a molten material M obtained by melting and plasticizing a material into a fluid, toward a die (not shown) abutted with a tip of a nozzle 21, to charge the same into a cavity of the die. Pelletized or powdered thermoplastic resin or thermosetting resin is often used as a material. However, metal, ceramic, carbon or wood may be mixed with these resins each functioning as a binder. A main portion of the injection device 10 is comprised of a heating cylinder 16 into which a plunger 11 is reciprocably inserted, and which heats the molten material M and keeps the same warm; the nozzle 21 provided on a tip of the heating cylinder 16; a storage portion 19 formed on a front portion of an inner hole of the heating cylinder 16 and in front of the plunger 11; a branching passage 18 connected to the storage portion 19 and the nozzle 21 and provided in front of a tip of the plunger 11; and a supply passage 17 connected to the branching passage 18 to supply the molten material M to the storage portion 19. The plunger 11 is connected to a reciprocating drive unit (not shown) comprised of a cylinder device or a servomotor, a ball screw, etc. The molten material M is intermittently and selectively discharged from a plasticizing device (not shown) comprised of another heating cylinder, a screw, etc. to the supply passage 17 via a valve (not shown).

The plunger 11 is comprised of a base 12 connected to the reciprocating drive unit; a sealing portion 13 having a cylinder portion secured to the end portion of the base 12, on the side of the nozzle 21; a core keeping portion 14 formed on the end portion of the sealing portion 13, on the side of the nozzle 21; and a conical tip 15 formed on the end face of the core keeping portion 14 having a cylinder portion, on the side of the nozzle 21. The sealing portion 13 is provided so that a gap A is formed between the sealing portion 13 and an inner wall 32 of the heating cylinder 16. The diameter of the base 12 is smaller than that of the sealing portion 13. Accordingly, the gap A is large enough to easily slide and reciprocate the plunger 11 on the inner wall 32 of the heating cylinder 16, and is small enough to prevent the molten material M from easily entering therethrough. For example, if the plunger 11 has a sealing portion 13 having a diameter of 60 mm, the gap A is 0.02 to 0.07 mm. The core keeping portion 14 is provided so that a gap B is formed between the core keeping portion 14 and the inner wall 32 of the heating cylinder 16. The gap between the core keeping portion 14 and the inner wall 32 of the heating cylinder 16 is 0.05 to 1 mm larger than the gap between the sealing portion 13 and the inner wall 32 of the heating cylinder 16. Thus, the molten material M can easily enter an annular portion 20 formed from the gap between the core keeping portion 14 and the inner wall 32 of the heating cylinder 16. The core keeping portion 14 may be formed so as not to have a cylinder portion which keeps the gap B uniform, and the gap B may be increased toward the nozzle 21.

The tip 15 has a conical shape having a cone angle identical to that of a tapered surface provided on the front portion of an inner hole of the heating cylinder 16, in which the diameter thereof is gradually reduced. It is preferable that an angle a of this conical shape is about 90 degrees. In the conical tip 15, if the angle a is small, an effect similar to that caused by the core keeping portion 14 can be obtained. However, in this respect, the plunger 11 has to be extended in a moving direction thereof. Accordingly, the angle a cannot be unnecessarily decreased.

When an injection molding is carried out in the above injection device 10, the molten material M is transferred from a plasticizing device (not shown) connected to the supply passage 17 to backwardly move a predetermined distance the plunger 11 in accordance with the volume of a product to be molded in a die. As a result, a predetermined amount of molten material M is stored in the storage portion 19 formed in front of the plunger 11 in the inner hole of the heating cylinder 16. After the supply passage 17 is closed by a valve (not shown), the reciprocating drive unit forwardly moves the plunger 11. The forwardly moved plunger 11 injects the molten material M through the nozzle 21 to charge the molten material M into a cavity of a die, against which the tip of the nozzle 21 is abutted. In this respect, in the molten material M, an injection pressure associated with a fluid resistance occurred when the molten material M is charged into the cavity of the die, occurs. In general, the injection pressure increases as the plunger 11 moves forwardly, and reaches a maximum value when the cavity of the die is substantially filled with the molten material M. The molten material M having a high injection pressure in the storage portion 19 enters the gap B between the inner wall 32 of the heating cylinder 16 and the core keeping portion 14, to fill the annular portion 20 connected to the storage portion 19.

Figure 2:
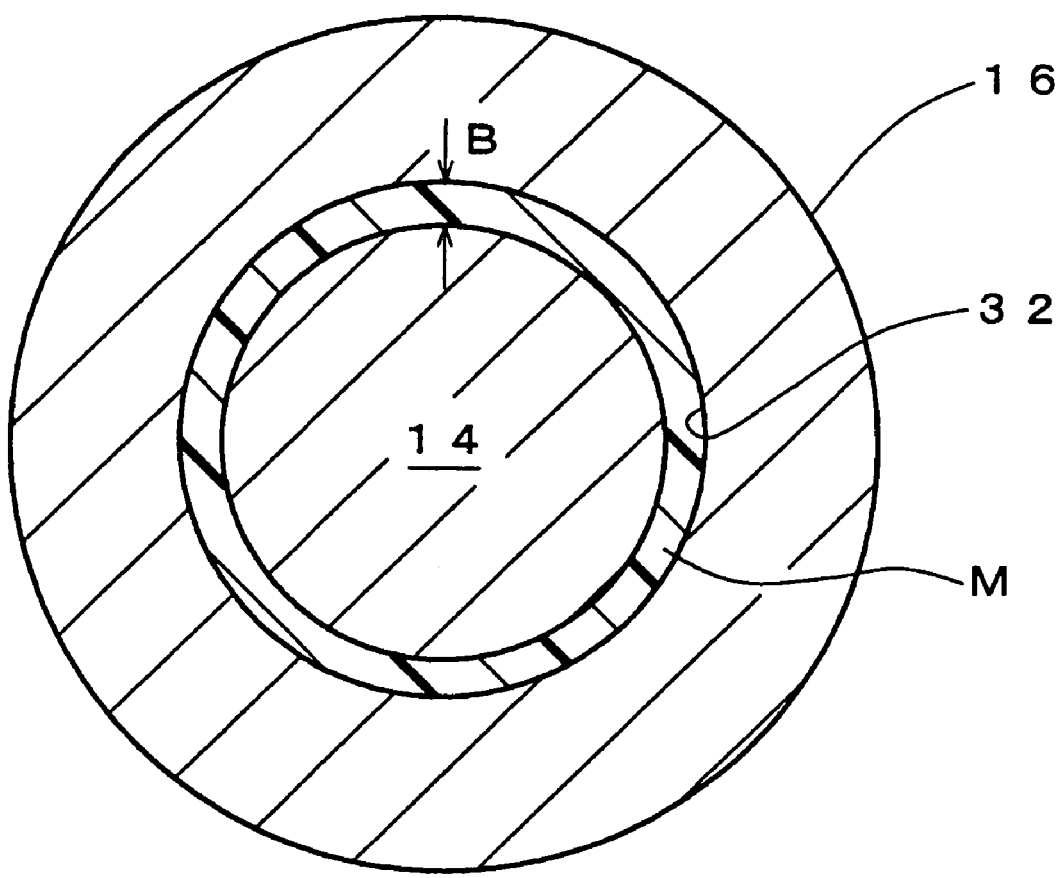
FIG. 2 is a sectional view of a core keeping portion in FIG. 1.

As shown in FIG. 2, for the molten material M that enters and fills the annular portion 20, the gap B is large enough to adapt to the flowability of the molten material M. Accordingly, the gap B between the core keeping portion 14 and the inner wall 32 of the heating cylinder 16 is provided so that the molten material M can easily enter the entirety of the annular portion 20 and can be uniformly distributed therein. The injection pressure of the molten material M is uniformly applied to the entire circumference of the gap B defined by the inner wall 32 of the heating cylinder 16 and the external surface of the core keeping portion 14. Thus, the core keeping portion 14 and the sealing portion 13 is kept at a position coaxial with the inner hole of the heating cylinder 16. Furthermore, the core keeping portion 14 has a length D that is about a half of the diameter of the sealing portion 13 and, accordingly, the injection pressure of the molten material M in the annular portion 20 decreases as it moves toward the sealing portion 13. Thus, the amount of the molten material M that enters the gap A between the sealing portion 13 and the inner wall 32 of the heating cylinder 16 extremely decreases and, accordingly, the molten material M is prevented from leaking through the sealing portion 13, and a scoring is prevented from occurring on the sealing portion 13 and the inner wall 32.

It is preferable that the length D of the core keeping portion 14 is about a half of the diameter of the sealing portion 13. However, the length D varies depending on the variation of the viscosity of the molten material M, which is associated with the difference of a material. Namely, the length D of the core keeping portion 14 is relatively long when the viscosity of the molten material M is low, and is relatively short when the viscosity of the molten material M is high. It is preferable that the gap B is 0.05 to 1 mm larger than the gap between the sealing portion 13 and the inner wall 32 of the heating cylinder 16. However, for a reason similar to that in the length D, the gap B is relatively small when the viscosity of the molten material M is low, and is relatively large when the viscosity of the molten material M is high. However, an unnecessary increase of the length D and the gap B of the core keeping portion 14 increases the capacity of the annular portion 20 and the amount of the residual molten material M, and a defect such as a burn occurs due to the residual molten material M. Accordingly, the length D and the gap B are set to be relatively small within a range that an effect can be obtained. As the gap B between the core keeping portion 14 and the inner wall 32 of the heating cylinder 16 is 0.05 to 1 mm larger than the gap A between the sealing portion 13 and the inner wall 32 of the heating cylinder 16, the molten material M does not remain in the annular portion 20. Thus, the molten material M can be prevented from leaking through the plunger 11, and the plunger 11 can be effectively prevented from generating a scoring.

Figure 3:
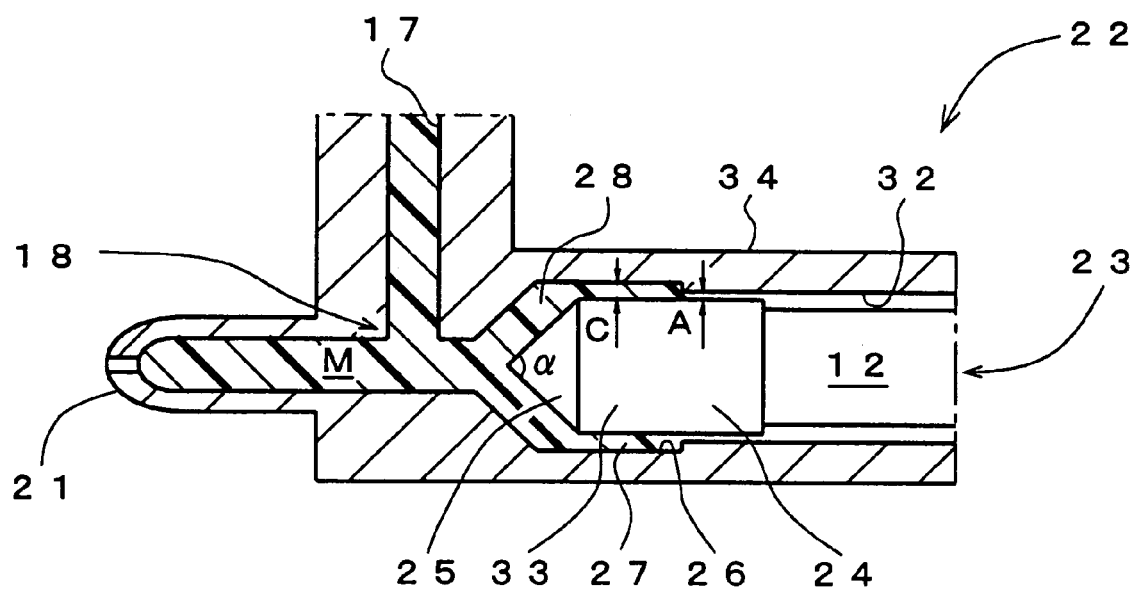
FIG. 3 is a sectional view of another embodiment of a main portion of an injection device according to the present invention.

Another embodiment of the present invention will be described below with reference to FIG. 3. In FIG. 3, each of components designated by numerals identical to those in FIG.

Figure 4:
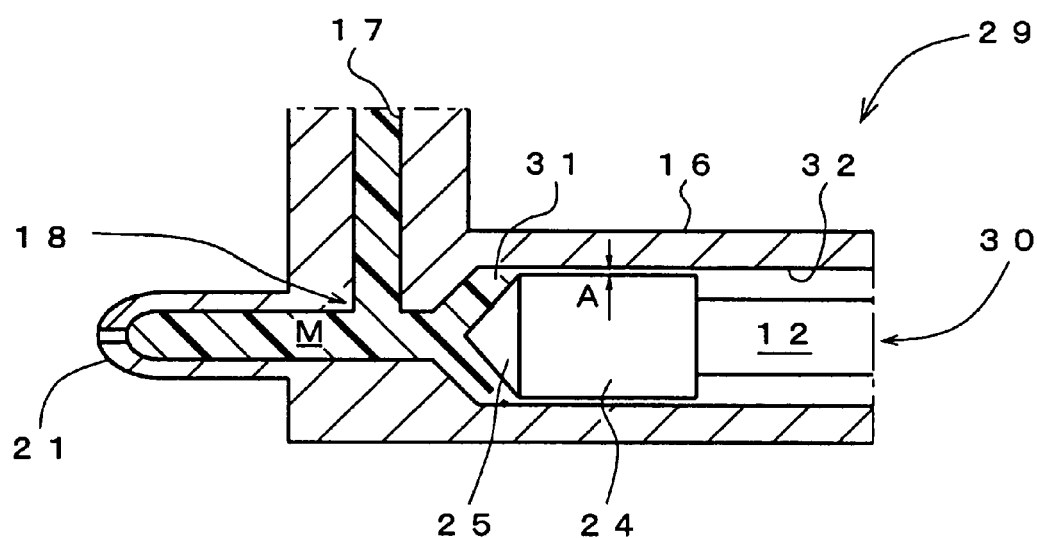
FIG. 4 is a sectional view of a main portion of a conventional injection device.

1 has the same or similar function. Namely, an injection device 22 in FIG. 3 has a plunger and a heating cylinder different from those of the injection device 10 in FIG. 1. A plunger 23 is comprised of the base 12 connected to a reciprocating drive unit (not shown); a sealing portion 24 secured to the end portion of the base 12, on the side of the nozzle 21; and a conical tip 25 formed on the end face of the sealing portion 24, on the side of the nozzle 21. Namely, the plunger 23 has a shape identical to that of a conventional plunger 30 of an injection device 29 shown in FIG. 4. A heating cylinder 34 has an inner wall 32 provided so that a gap A is formed between the inner wall 32 and the sealing portion 24 of the plunger 23, the portion of the inner wall 32, on the side of a tapered surface provided on the front portion of the inner hole of the heating cylinder 34 is formed as a diameter-increased portion 26 having a diameter increased by 0.1 to 2 mm.

When the plunger 23 has discharged the molten material M and reaches a forwardmost position, more than half of the sealing portion 24 is inserted into the diameter-increased portion 26, and a gap C is formed between a holding portion 33 and an inner wall of the diameter-increased portion 26. The molten material M enters the gap C to form an annular portion 27. In view of the diameter of the diameter-increased portion 26, it is preferable that the gap C is 0.05 to 1 mm. Mode of operation and effect of the annular portion 27 are similar to those of an embodiment in FIG. 1. Numeral 28 in FIG. 3 designates a storage portion.

The present invention is not limited to the above-described embodiment, and several modifications may be made therein without departing from the gist of the invention.

What is claimed is:

1. An injection device having a heating cylinder, the device comprising:
   a plunger reciprocably inserted into the heating cylinder, and disposed such that a molten material supplied into a storage portion disposed at a front end of the plunger is injected by the plunger via a nozzle into a die, said plunger comprising:
   a base connected to a reciprocating drive unit;
   a cylindrical sealing portion secured to an end portion of said base on the side of the nozzle and disposed so that the molten material is prevented from easily entering a gap between the plunger and an inner wall of the heating cylinder; and
   a cylinder core keeping portion formed on an end portion of said sealing portion on the side of the nozzle provided such that an annular space is defined between a front portion of the plunger and the inner wall of the heating cylinder, and the annular space is connected to the storage portion.

2. An injection device according to claim 1, wherein a gap between the cylinder core keeping portion and the inner wall of the heating cylinder is set so that a molten material can easily enter the entirety of the annular portion.

3. An injection device according to claim 1, wherein a gap between the cylinder core keeping portion and the inner wall of the heating cylinder is 0.05 to 1 mm larger than a gap between the sealing portion and the inner wall of the heating cylinder.

4. An injection device comprising:
   a plunger reciprocably inserted into a heating cylinder, and disposed such that a molten material supplied to a storage portion disposed at a front end of the plunger is injected by the plunger via a nozzle into a die, said plunger comprising:
   a base connected to a reciprocating drive unit;
   a cylinder sealing portion connected to said base on the side of the nozzle and having a cylinder portion provided such that a molten resin cannot easily enter a gap between the cylinder portion and an inner wall of the heating cylinder; and
   a cylinder core keeping portion having a cylinder portion formed on an end of the sealing portion, on the side of the nozzle, said cylinder portion of said cylinderical core keeping portion having a diameter smaller than that of the cylinderical sealing portion and being provided so that a gap between the cylinder portion of said cylinderical core keeping portion and the inner wall of the heating cylinder is larger than the gap between the cylinderical sealing portion and the inner wall of the heating cylinder.

5. An injection device according to claim 4, wherein a gap between the cylinderical sealing portion and the inner wall of the heating cylinder is 0.02 to 0.07 mm, and a gap between the cylinderical core keeping portion and the inner wall of the heating cylinder is 0.05 to 1 mm larger than a gap between the cylinderical sealing portion and the inner wall of the heating cylinder.

6. An injection device comprising:
   a plunger reciprocably inserted into a heating cylinder, and disposed such that a molten material supplied to a storage portion disposed at a front tip of the plunger is injected by the plunger via a nozzle into a die,
   said heating cylinder comprising a front portion of the inner wall of the heating cylinder having a first portion and a second portion, the first portion being closer to the nozzle than the second portion and the first portion having a diameter larger than a diameter of the second portion; and
   said plunger comprising a cylinderical sealing portion having a cylinder portion provided so that a molten resin cannot easily enter a gap between the cylinder portion and the inner wall of the heating cylinder at completion of an injection; and
   a cylinderical core keeping portion having a cylinder portion formed on the portion of the cylinderical sealing portion, on the side of the nozzle, said cylinder portion being provided so that an annular space is defined between the cylinder portion and the first portion of the inner wall of the heating cylinder at completion of an injection.

7. An injection device according to claim 6, wherein the first portion of the inner wall of the heating cylinder has a diameter that is 0.1 to 2 mm larger than that of the second portion of the inner wall.

* * * * *